United States Patent [19]

Keiser

[11] 4,284,880
[45] Aug. 18, 1981

[54] HEATING WELL
[75] Inventor: William Keiser, St. Louis, Mo.
[73] Assignee: International Foodservice Equipment Systems, Inc., Elgin, Ill.
[21] Appl. No.: 9,948
[22] Filed: Feb. 6, 1979
[51] Int. Cl.³ .............................................. H05B 1/00
[52] U.S. Cl. .................... 219/415; 219/386; 219/430; 219/432; 219/439
[58] Field of Search ............... 219/415, 417, 419, 385, 219/386, 387, 536, 401, 421, 429, 430, 432, 433, 436, 438, 439; 126/276, 201, 275 E, 284, 373–375, 90 A, 390

[56] References Cited
U.S. PATENT DOCUMENTS

| | | | |
|---|---|---|---|
| 1,154,993 | 9/1915 | Kercher | 219/439 |
| 1,530,416 | 3/1925 | Saeki | 219/415 |
| 1,764,685 | 6/1930 | Kollman | 126/390 |
| 1,850,193 | 3/1932 | Zahner | 219/218 |
| 2,466,349 | 4/1949 | Anderson | 219/416 |
| 2,679,841 | 6/1954 | Mucker | 126/376 |
| 2,719,906 | 10/1955 | Fry | 219/416 |
| 2,847,552 | 8/1958 | Gates | 219/434 |
| 3,691,347 | 9/1972 | Finn | 219/536 |
| 3,725,641 | 4/1973 | Tilp | 219/430 |
| 4,024,377 | 5/1977 | Henke | 219/430 |
| 4,051,346 | 9/1977 | Lenmark | 219/536 |

Primary Examiner—Gene Z. Rubinson
Assistant Examiner—Bernard Roskoski
Attorney, Agent, or Firm—Gottlieb, Rackman & Reisman

[57] ABSTRACT

A heating well for a hot food serving appliance wherein a heat dispersing plate is supported on ledges provided adjacent the lower end of a well housing. An open-top stainless steel well pan fits within the housing with the bottom wall of the pan residing against the heat dispersing plate. A high-temperature electric heating element, mechanically secured against the underside of the heat dispersing plate by tabs, heats the well pan and a removable food pan nested within the well pan. The heat dispersing plate is fabricated from cold rolled steel, or any other suitable material having moderate thermal conductivity, to retard spot heating of the well pan and eliminate, or substantially reduce, thermal cracking of the stainless steel well pan. Simplified assembly of the heating well is accomplished by means of resilient push rivets.

5 Claims, 6 Drawing Figures

HEATING WELL

BACKGROUND OF THE INVENTION

This invention relates generally to hot food serving appliances and, more particularly, to a counter top drop-in heating well which is more easily assembled than conventional wells heretofore available and wherein thermal cracking of the stainless steel well pan and heat stress failure of other components are substantially reduced or eliminated.

In the commercial food service industry, hot food serving appliances often utilize heating wells to store and keep bulk quantities of heated food warm until the food is served as individual portions. Typical of such units are those available from Seco Products, Southern Equipment Division, McGraw-Edison Company, Elgin, Illinois, the assignee of the present invention.

Other hot food serving units and food heating appliances are shown generally in the following U.S. Pat. Nos: 3,991,739—Hoffman; 3,443,063—Berger et. al.; 2,976,391—Carlson; 2,847,552—Gates; 2,709,215—Miller; 2,679,841—Muckler; 1,151,189—Kercher; and 1,120,758—Stirn.

Such hot food serving devices commonly include a heated, open-top well built into the counter top of a serving unit for heating a smaller pan that nests in the well from above and which holds the food. The well itself may include a larger deep-drawn pan, or container, in which the food pan nests as well as a high-temperature electric heating element for heating the well pan. The food pan is generally spaced from the walls of the well pan, and relatively low-temperature heat is transmitted from the well pan to the food pan to maintain the stored food at a warm temperature. Dry heating is accomplished by a combination of conduction, convection, and radiation while moist heating, such as by steam, can be accomplished by putting water in the heated well pan.

The well pan is typically formed from stainless steel for sanitary reasons, and the high-temperature heating element is secured to the underside of a heating plate positioned against the bottom of the well pan. Alternatively, the heating element may be located adjacent the bottom of the well pan without the use of a heating plate. In commercially available heating wells utilizing a heating plate, aluminum plates have heretofore been used. Aluminum, however, has a relatively high thermal conductivity factor, or K, typically 130 Btu/hr./ft./°F. at 400° Fahrenheit, and the high temperature of the electric heating element commonly used, typically in the order of 1100° Fahrenheit, results in spot heating, or the rapid application of heat, through the aluminum plate to the portions of the well pan directly overlying the heating element. It has been found that cracking of the stainless steel well pan, from what metallurgists call carbide precipitation, may occur during continued use when the well pan is rapidly heated and then alternately heated and cooled at temperatures of approximately 800° Fahrenheit or higher. Intergranular corrosion may result, leaving cracks in the stainless steel well pan which frequently occur in the area of the high-temperature heating element. Further, because the temperature of the heating element approaches the melting point of aluminum, some heating wells have incorporated supplementary thermostats for limiting the temperature which the heating element attains.

A problem also arises in providing means for securing the heating element in the well relative to the well pan. One manner of securing the high-temperature heating element against the well pan utilizes draw-down clamps secured to studs welded directly to the well pan. Alternatively, the heating element has also been bolted to the underside of the heating conducting plate which in turn, has been welded or otherwise mounted in the well unit. The studs and welds frequently break, however, because of the heat stress generated by the repeated expansion and contraction of these components during the use and non-use cycles of the heating well.

Finally, because the many component parts comprising the heating well unit in known hot food serving devices are assembled with bolts, sheet metal screws and/or by welding, such units are not only subject to heat stress failure but, in addition, are relatively expensive to fabricate, requiring complicated assembly procedures.

SUMMARY OF THE INVENTION

This invention discloses an improved heating well construction wherein thermal cracking of the stainless steel well pan due to spot heating is substantially reduced or eliminated, wherein studs, draw-down clamps and welds for securing the high-temperature heating element adjacent the well pan are eliminated, and which is more easily and economically fabricated with fewer component parts.

The well construction of the present invention includes a metal housing, or wrapper, having an open top end and a flanged open bottom end. Support angle members are secured to the inside of the well housing near the flanged open bottom end, such as by push rivets or welds removed from the area of the high-temperature heating element, to support a heat dispersing plate which fits through the open top end of the housing. A high-temperature electric heating element is mechanically secured to the underside of the heat dispersing plate by cooperating tabs stamped from the plate while a well pan adapted to fit within the open top end of the well housing rests directly against the upper side of the heat dispersing plate.

The heat dispersing plate is preferably formed from cold rolled steel having a moderate thermal conductivity factor, i.e., $K=25$ Btu/hr./ft./°F. at 400° Fahrenheit, but may also be formed from any other metal or alloy exhibiting relatively moderate heat transfer characteristics, e.g., $35>K>20$, with respect to that of aluminum. The reduced thermal conductivity of the heat dispersing plate eliminates, or substantially reduces, the occurrence of spot heating and limits the maximim temperature to which the well pan is heated to below 800° Fahrenheit.

At its open top end, the well pan has a curved outwardly directed horizontal flange, or rim, that engages the underside of the counter top and overlaps the top edge of the well housing to minimize migration of dirt or the like into the well. A bottom cover plate is secured to and closes the open flanged bottom end of the well housing. Insulation between the well pan and the well housing and between the heat dispersing plate and the bottom cover plate minimizes undesirable heat transfer from the well.

The well is assembled with push rivets which extend through aligned openings in the bottom cover plate and the flanges at the bottom end of the well housing and by push rivets which extend through aligned openings in the well housing and underlying brackets secured to the well pan near its top edge. The inherent resiliency of the push rivets provides firm securement means but permits expansion and contraction of the assembly due to heat without resulting physical failure.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings, in which like reference numerals identify like elements in the several figures and in which:

DETAILED DESCRIPTION

Figure 1:
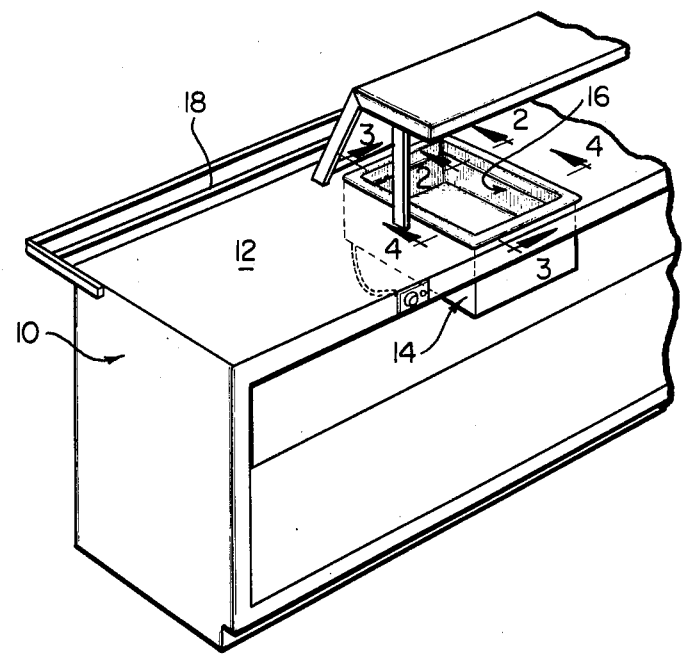
FIG. 1 is a partial perspective view of a typical hot food serving counter having the heating well of the present invention installed therein and showing a food pan nested in the well.

In the drawings, FIG. 1 shows a typical hot food serving counter 10 providing a counter top 12 in which one or more of the heating wells of the present invention, such as the well identified generally by reference numeral 14, are installed to maintain food at a desired temperature in stainless steel food pans 16 nested in the heating wells. More particularly, the heating well 14 is secured to the underside of the counter top 12 and opens through the counter top to removably support the food pan 16 therein. In use, bulk quantities of prepared food are placed in the food pan 16 prior to being served as individual portions, and the heating well 14 serves to maintain the food at an optimum serving temperature for an extended period of time during which food is periodically removed as individual portions. The counter 10 also provides a front guide bar 18 for supporting trays (not shown) while food is transferred from the food pans to plates or other dishware carried on the trays. Since the food pans are removable, they can be lifted from the well when empty and replaced by full pans.

Figure 2:
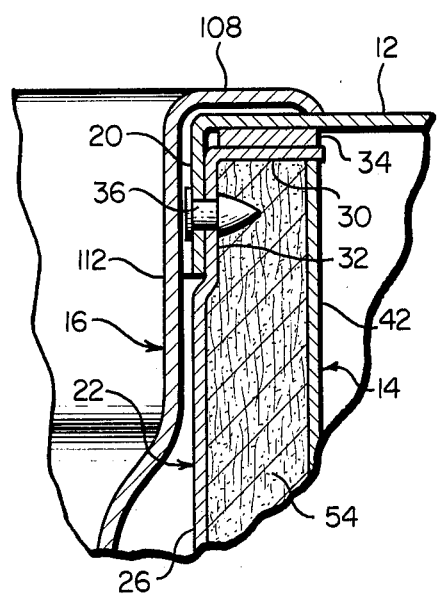
FIG. 2 is a partial sectional view taken along line 2—2 in FIG. 1 showing means for securing the heating well to the counter and the normal cooperation of the food pan within the well.

With reference to FIG. 2, the counter typically provides a generally rectangular opening through the counter top 12 defined by a peripheral down-turned flange 20 to which the heating well 14 is secured on the underside of the counter top. The well 14 itself includes a generally rectangular, deep-drawn, die-stamped one-piece stainless steel pan 22 which is shown elsewhere in the drawings to have a bottom wall 24, opposed side wall pairs 26 and 28 and a continuous outwardly-turned rim flange 30 at its open upper end. An off-set peripheral side wall portion 32 is also provided in the well pan side walls at the open end of the well, the well pan opening defined thereby being just slightly larger than the counter top opening defined by the counter flange 20. The well 14 is thus adapted to be positioned against the underside of the counter top 12 with the flange 20 protruding into and immediately adjacent the peripheral side wall portion 32 of the well pan. A gasket 34 is cemented to the upper surface of the rim 30 of the well pan and is compressibly located between the rim 30 and the underside of the counter top 12 to encircle the well pan opening and thereby minimize possible migration of dirt, water or the like into the well past this butted joint. Fastening means such as resilient push rivets 36 fit through openings spaced at intervals along the down-turned counter flange 20 and into aligned openings 38 in the off-set wall portion 32 of the well pan to hold the well in position relative to the counter. Alternatively, sheet metal screws can be used to secure the well to the counter.

Figure 4:
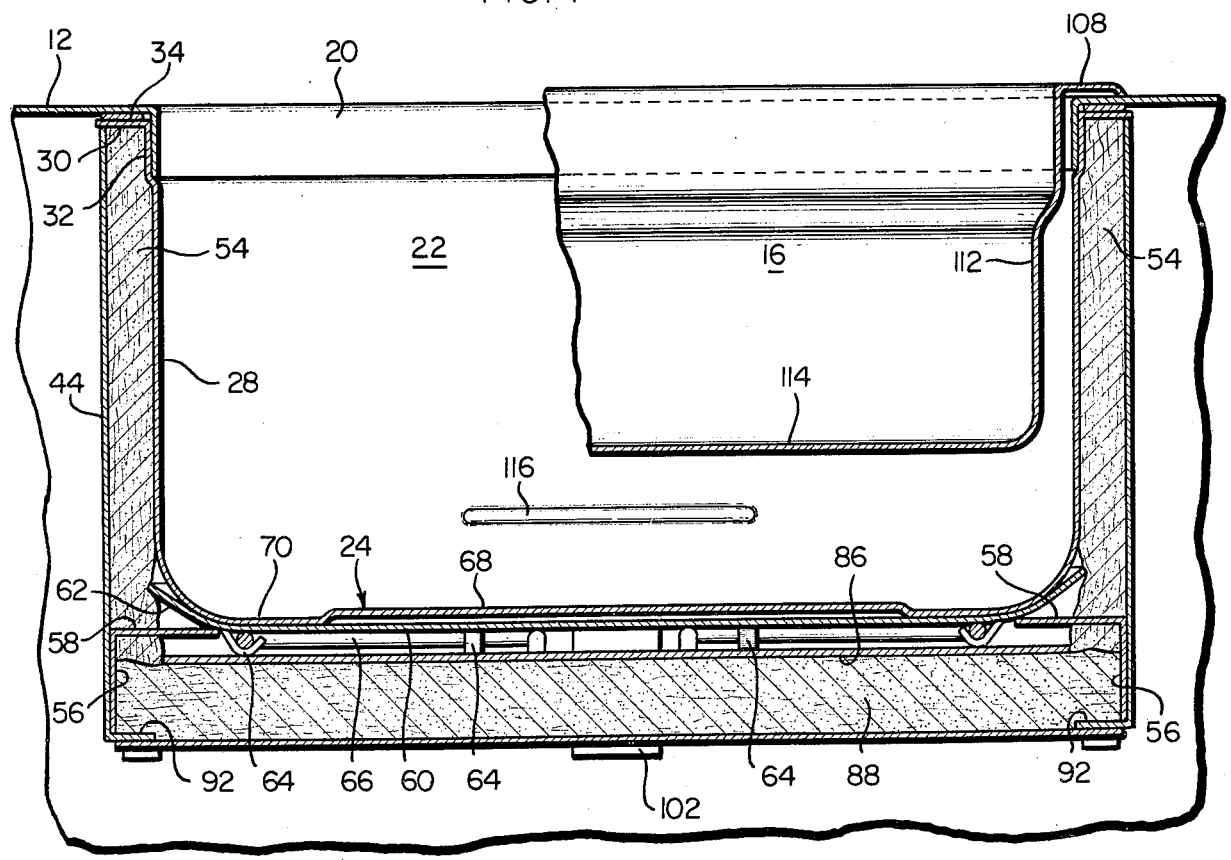
FIG. 4 is a sectional view similar to FIG. 3 taken along line 4—4 in FIG. 1.
Figure 3:
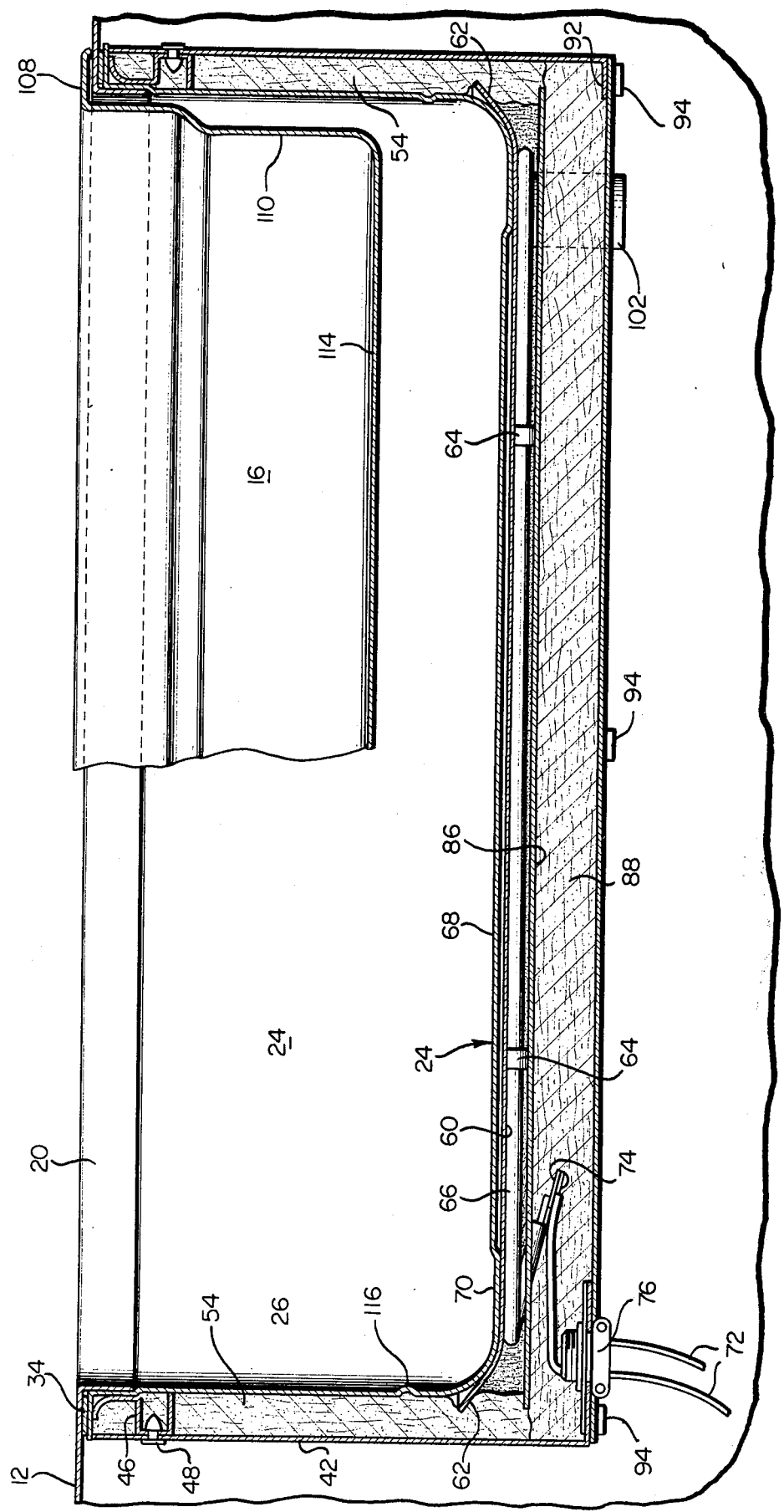
FIG. 3 is a partial sectional view taken along line 3—3 in FIG. 1 showing the food pan partially cut-away and in place in the heating well and means for securing the outer well housing to the well pan.
Figure 5:
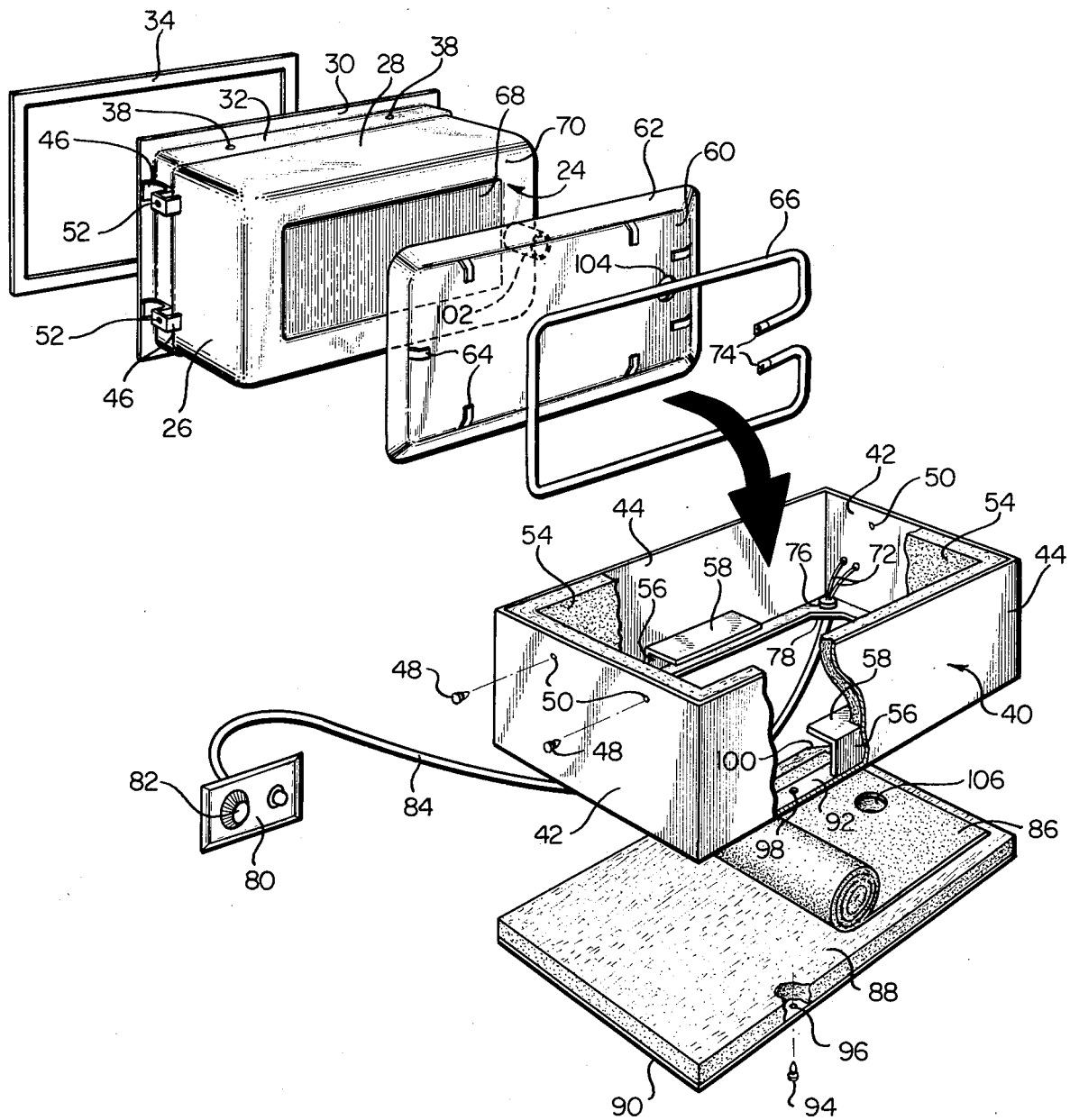
FIG. 5 is an exploded perspective view of the various components comprising the subject food heating well showing the components in a preassembled relationship.

As can also be seen in FIGS. 3-5, the well 14 further includes an open-ended well housing, or outer wrapper, 40 having a generally rectangular configuration provided by interconnected opposed side wall pairs 42 and 44. When the well is assembled, the well pan 22 is enclosed within the housing 40 with clearance space between side walls 26 and 28 of the food pan and the corresponding side walls 42 and 44 of the housing. Brackets 46 are secured by spot welding or the like adjacent the corners of the well pan 22 along the side walls 26 near the upper flange 30 and the off-set side wall portion 32, the brackets being dimensioned to fit snuggly against the adjacent portion of the well housing side walls 42. In accordance with one aspect of the present invention, resilient push rivets 48 are inserted through aligned openings 50 and 52 in the housing walls and the brackets, respectively, to secure the outer well housing 40 in position relative to the well pan 22. The use of resilient push rivets here, and throughout the assembly of the heating well permits expansion and contraction of the components comprising the well without resulting physical failure. Further, insulation 54, typically in the form of pads, is positioned in the well between the side walls of the well pan and the side walls of the housing to minimize the heat reaching other components as well as the escape of heat through the side walls of the housing.

Figure 6:
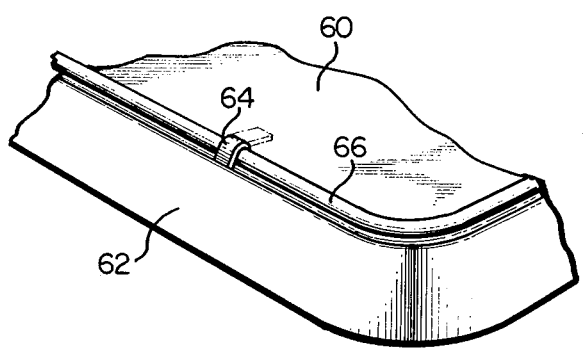
FIG. 6 is a partial perspective view, as seen from the underside of the heat dispersing plate, showing the manner in which the high-temperature heating element is secured to the plate.

A pair of angles 56 secured, such as by push rivets (not shown), spot welding or the like, to the housing walls 44 have legs defining opposed ledges 58 in the housing which are spaced above the open bottom end of the well housing. A sheet metal plate 60 is adapted to be supported on the ledges 58 and is preferably formed from cold rolled steel, or any other suitable metal or alloy having relatively moderate thermal conductivity characteristics. In the particular embodiment shown in the drawings, the plate 60 is generally planar, except for angularly upturned edges 62 which generally follow the contour of the well pan 22 disposed within the housing, and is die-stamped to provide down-turned tabs 64 at spaced locations along the periphery of its planar section. A sheathed high-temperature tubular electric heating element 66 having a generally rectangular configuration is positioned in adjacent relation to the tabs 64 thereby allowing the tabs to be folded over and against the heating element 66 to mechanically secure the heating element against the plate 60 as illustrated in FIG. 6. The bottom wall 24 of the well pan further provides a central recessed portion 68 for reinforcing, or strengthening, the peripheral portion 70 of the bottom wall to prevent warping of the bottom wall when the well pan is heated. Accordingly, when the well is in use, the heating element 66 underlies the strengthened peripheral bottom wall portion, and the moderately thermally conductive plate, in turn, disperses heat from the heating element to the well pan at a relatively gradual rate to retard spot heating and maintain the well pan at a temperature below 800° Fahrenheit.

A pair of electrical leads 72 attach to the end terminals 74 of the high-temperature heating element and extend through a coupling 76 mounted within an opening through a flanged corner 78 of the well housing. The opposite ends of the electrical leads 72 are connected to a control console 80 which includes a temperature control 82 allowing an operator to set the heating element to a desired temperature in the operating condition. A protective flexible cable 84 houses the leads between the coupling 76 and the control console 80 which is mounted, for example, at the rear of hot food serving counter 10.

Insulation, in the form of a rolled sheet of asbestos 86, resides against the high-temperature heating element 66 on the underside of the heat dispersing plate 60, and an additional insulation pad 88 is provided below the asbestos sheet. The asbestos sheet and the additional insulation pad combine to shield the angles 56 and other components from the high-temperature heating element 66 and to further prevent heat from escaping through the bottom of the housing. A bottom cover plate 90 closes the open bottom end of the well housing 40 and is secured to flanges 92 provided for that purpose by resilient push rivets 94 extending through respective aligned openings 96 and 98 in the cover and the flanges. One corner of the cover is notched at 100 to clear the electric coupling 76.

An optional drain tube 102 opens through the bottom wall 24 of the well pan and fits through aligned openings 104 and 106 in the heat dispersing plate 60 and the cover 90, respectively, to allow for the connection of a pipe or hose (not shown) to its exposed end to facilitate the drainage of water from the well pan.

Prior to its installation to the hot food serving counter, the heating well 14, is assembled, as illustrated in FIG. 5, by fitting the heat dispersing plate 60, with the high-temperature heating element 66 secured thereto, through the open top end of the well housing 40 until the plate butts against and is supported by the ledges 58. Next, the insulation pads 54 are positioned in the well housing above the heat dispersing plate 60 and adjacent each wall of the housing. The well pan 22 is then positioned into the housing within the cavity formed by the insulation 54, the well pan being supported on the upper side of the plate 60. As thus positioned, the out-turned rim 30 of the well pan overlaps the upper edges of the housing side walls 42 and 44 and is in generally close proximity thereto. The push rivets 48 are then forced through the aligned openings 50 and 52 provided in the housing side walls 42 and the well pan brackets 46, respectively, to secure the well housing to the well pan.

The well housing 40 may then be turned so that the high-temperature heating element 66 and the underside of the heat dispersing plate 60 are exposed through the open flanged bottom end of the housing. The electrical leads 72 are then connected to the end terminals 74 of the high-temperature heating element, and the asbestos sheet 86 is positioned against the high-temperature heating element and the underside of the heat dispersing plate. Thereafter, the additional insulation pad 88 is placed against the asbestos sheet 86. The bottom cover plate 90 is fitted against the bottom of the well housing 40 and secured to the housing by the push rivets 94 which are inserted through the aligned openings 96 and 98 in the cover and the housing flanges to complete the assembly.

As shown in the drawings, the food pan 16 typically has a top rim flange 108 extending outwardly from continuous intermediate contoured peripheral side wall pairs 110 and 112. At its uppermost extremity, the food pan side walls 110 and 112 are dimensioned to be smaller than the corresponding dimensions of the well pan. The food pan is thus adapted to nest within the well pan and be supported therein by the top flange 108 which rests on the counter top 12, there being between one-half inch and one inch clearance between the sides of the food pan and the well pan at their respective uppermost extremities. The bottom wall 114 of the food pan is typically spaced between two inches and four inches above the bottom wall of the well pan thereby allowing for a variation in food pan designs and for the optional use of water in the well pan to provide moist heating. An embossed line 116 may be provided on at least one side wall of the well pan to indicate the optimum level of water which should be put in the well pan for moist heating operation.

In operation, the heat generated by the energized high-temperature heating element 66 in the heating well is gradually dispersed by the moderately thermally conductive plate 60 to the bottom wall of the well pan to retard spot heating, the well pan ultimately being heated to a maximum temperature below 800° Fahrenheit. The heat from the well pan is then transferred either by steam, if water is present in the well pan, or if no water is used, by a combination of conduction, convection and radiation, to the food pan.

In accordance with one aspect of the present invention, the heat dispersing plate 60 is preferably fabricated from sixteen gauge, or thicker, cold rolled steel having a thermal conductivity factor, or K of approximately 25 Btu/hr./ft./°F. at 400° Fahrenheit, or any other metal or alloy having only moderate thermal conductivity with respect to the thermal conductivity of aluminum, e.g., $35 > K > 20$. Accordingly, heat from the high-temperature heating element 66 is dispersed by the plate 60 to gradually heat the entire bottom wall of the well pan 22, the moderate thermal conductivity of the plate keeping the temperature of the well pan at less than 800° Fahrenheit even though the surface temperature of the heating element may reach temperatures in excess of 1100° Fahrenheit. Thus, the provision of the cold rolled steel heat dispersing plate 60 eliminates, or greatly reduces, the occurrence of thermal cracking of the stainless steel well pan due to spot heating.

Also, because the disclosed well construction is simple and utilizes a minimal number of physical components, it is easily assembled, and the use of easily installed and economical resilient push rivets facilitates the quick and easy assembly or, if required, the disassembly, of the well unit while reducing heat stress failure of the components comprising the well. Moreover, the assembly does not require the use of any welds, studs, draw-down clamps or the like in areas where high levels of heat are present.

While a particular embodiment of the present invention has been shown and described, it will be obvious to those skilled in the art that various changes and modifications may be made without departing from the invention in its broader aspects. Accordingly, the aim in the appended claims is to cover all such changes and modifications which may fall within the true spirit and scope of the invention.

I claim:

1. An improved heating well for mounting to the underside of a counter top having an opening therein and for receiving through said counter top opening a removable food pan and maintaining food in said food pan at a desired temperature, said heating well comprising:

a well pan having an open top end, continuous side walls, and a bottom wall;

means for mounting the well pan to a counter top under an opening in the counter top;

an outer housing having an open top end and an open bottom end, said open bottom end having flanges extending therefrom, said well pan being located in the housing with said side walls being spaced inwardly from the housing;

a plurality of brackets secured to said well pan and extending from said side walls to be adjacent said housing, each of said brackets and said housing having aligned holes therethrough;

a plurality of resilient push rivets adapted to be installed in said aligned holes to secure said housing to said well pan;

means including at least two angle members for providing peripheral support surfaces facing the open top end of said housing, each of said angle members having a first leg secured to said housing and a second leg extending inwardly in said housing;

a metallic heat dispersing plate adapted to fit through the open top end of the housing and be supported on the support surfaces with the bottom wall of said well pan residing on said heating dispersing plate;

means including a high-temperature electric heating element for heating said well pan through said heat dispersing plate, said heat dispersing plate having a plurality of tabs stamped therefrom and bent to extend from the underside thereof and over said heating element to secure said heating element below said heat dispersing plate;

a bottom cover, said bottom cover and said bottom end flanges having aligned holes therethrough; and means including a second plurality of resilient push rivets adapted to be installed in said aligned holes to secure said bottom cover to the bottom end of said housing.

2. An improved heating well in accordance with claim 1 wherein the side walls of said well pan have aligned holes therethrough, and wherein said well pan mounting means comprises a third plurality of resilient push rivets adapted to be installed in said aligned holes to secure said well pan to the counter top.

3. An improved heating well in accordance with claim 1 including means comprising insulation disposed between said well pan side walls and said housing and between said heat dispersing plate and said bottom cover for minimizing the loss of heat from said housing.

4. An improved heating well in accordance with claim 1, 2 or 3 wherein said heat dispersing plate comprises a metal plate having a thermal conductivity factor (K) in the range between about 20 Btu/hr./ft./°F. at 400° Fahrenheit and about 35 Btu/hr./ft./°F. at 400° Fahrenheit.

5. An improved heating well in accordance with claim 4 wherein said heat dispersing plate comprises a cold rolled steel plate of at least sixteen (16) gauge thickness.

* * * * *